United States Patent [19]

Kempf et al.

[11] Patent Number: 5,359,721

[45] Date of Patent: Oct. 25, 1994

[54] NON-SUPERVISOR MODE CROSS ADDRESS SPACE DYNAMIC LINKING

[75] Inventors: James Kempf, Mountain View; Michael L. Powell, Palo Alto, both of Calif.

[73] Assignee: Sun Microsystems, Inc., Mountain View, Calif.

[21] Appl. No.: 809,668

[22] Filed: Dec. 18, 1991

[51] Int. Cl.⁵ .............................................. G06F 13/00
[52] U.S. Cl. ........................... 395/425; 395/650; 395/700; 364/286; 364/286.4; 364/286.5; 364/254; 364/254.2; 364/DIG. 1
[58] Field of Search .................. 364/286.5, 280.4, 973, 364/262.5, 262.4; 395/650

[56] References Cited

U.S. PATENT DOCUMENTS

| | | | |
|---|---|---|---|
| 4,430,705 | 2/1984 | Cannavino et al. | 364/200 |
| 4,445,177 | 4/1984 | Bratt et al. | 364/200 |
| 4,652,990 | 3/1987 | Pailen et al. | 364/200 |
| 4,669,043 | 5/1987 | Kaplinski | 364/200 |
| 5,159,678 | 10/1992 | Wengelski et al. | 395/425 |
| 5,170,465 | 12/1992 | McKeeman et al. | 395/700 |
| 5,175,828 | 12/1992 | Hall et al. | 395/375 |
| 5,182,806 | 1/1993 | McKeeman et al. | 395/700 |
| 5,193,191 | 3/1993 | McKeeman et al. | 395/700 |

Primary Examiner—Gareth D. Shaw
Assistant Examiner—Jonathan Tseng Backenstose
Attorney, Agent, or Firm—Blakely Sokoloff Taylor & Zafman

[57] ABSTRACT

In a network of object oriented distributed systems, a plurality of program code managers, each having access to a plurality of program code segment objects, a plurality of address space managers, each having access to a plurality of address space objects having linked program segment and symbol address information, and a plurality of trusted third party authentication managers are provided, thereby allowing a client process executing in non-supervisor mode to be able to dynamically link a program segment to either another program segment in another address space or a process in either another address space or the client's address space, without compromising the security of the systems.

16 Claims, 7 Drawing Sheets

NON-SUPERVISOR MODE CROSS ADDRESS SPACE DYNAMIC LINKING

BACKGROUND OF THE INVENTION

1. Field of the Invention

The present invention relates to the fields of distributed computer systems, distributed operating system, and object oriented programming. More particularly, the present invention relates to cross address space dynamic linking of program code segments at program start, and dynamic linking of a program code segment to a process.

2. Background

Today, most modem computer systems with virtual memory systems and multiprocessing allow more than one address space to be active at one time. The central processing unit (CPU) or units switch between the active address spaces at high speed. An address space is a range of logical addresses representing a range of memory locations within which programs and data may be stored.

Address spaces form a layer of security protection for the computer system. A process executing in non-supervisor mode in one address space typically cannot access another process executing in another address space, except through special means provided by the operating system. This prevents a process in one address space whose security has been compromised from damaging the entire computer system. A process is an instance of a program in execution.

On the other hand, operations performed by a process in supervisor mode are by definition secure. Entering supervisor mode before a process is allowed to perform operations on an address space therefore ensures that system security is not compromised. Thus, traditional operating systems typically require a process to enter supervisor mode before it can dynamically load a program into an address space. Loading a program into an address space involves obtaining memory from the operating system and associating the binary code of a program with the memory obtained.

If the program consists of several unconnected segments of binary code, and the segments of binary code have not been statically linked together before the program is loaded into the address space, the segments of binary code will have to be dynamically linked together after they are loaded into the address space, before execution of the program can be started. Typically, if the program has been statically linked, then only one "segment" of binary code is loaded, otherwise, more than one segment of binary code is loaded. Traditionally, operating systems also require the process to perform the dynamic linking in supervisor mode or within the address space where the program code to be linked is located. Linking segments of binary code involves resolving references in one segment of binary code which require addresses in the other.

Additionally, a dynamically linked program typically requires an initialization function to be called before starting execution. The initialization sets up the initial conditions required by the linked program's programming language run time system, and is necessary for the linked program to function correctly.

Supervisor mode cross address space dynamic linking was originally part of the Multix operating system and TENIX. Because it was perceived to involve excessive overhead, supervisor mode cross address space dynamic linking was dropped from most operating systems, until it was reintroduced in UNIX TM System V (Unix TM is the registered trademark of Unix Laboratory). Today supervisor mode cross address space dynamic linking is offered in OSF/1. For further description of supervisor mode cross address space dynamic linking under these operating systems, see E. I. Organick, *The Multics System: An Examination of Its Structure*, MIT Press, 1972, D. L. Murphy, *Storage organization and management in TENIX*, Proceedings of the Fall Joint Computer Conference, AFIPS, 1972, J. Q. Arnold, *Shared Libraries on Unix System V*, Summer Conference Proceedings, USENIX Association, 1986, and L. W. Allen, H. G. Singh, K. G. Wallace, and M. B. Weaver, *Program Loading in OSF/1*, Proceedings of the USENIX Winter 1991 Conference, 1991.

Non-supervisor mode dynamic linking within an address space was made available on the operating system SunOS 4.1, offered by the assignee of the present invention, Sun Microsystems, Inc. of Mountain View, Calif. (Sun TM is a registered trademark of Sun Microsystems, Inc.). Under SunOS 4.1, a process without having to enter supervisor mode first, can dynamically link shared libraries into itself when it starts up. Because the non-supervisor mode dynamic linking is limited to linking shared libraries to the process itself, therefore a process with compromised security can only affect the address space within which the process is executing. For further descriptions of dynamic linking under SunOS 4.1, see R. A. Gingell, M. Lee, X. T. Dang and M. S. Weeks, *Shared Libraries in SunOS*, Proceedings of USENIX Summer 1987 Conference, 1987. A similar procedure is used for dynamic linking on UNIX TM System V Release 4, see *System V Application Binding Interface*, Prentice Hall, 1991.

While limiting dynamic linking across address spaces to processes executing in supervisor mode or processes within the address space where the program code to be linked is located has the benefit of preventing a compromised process from compromising the entire system, it severely limits the extent to which dynamic linking can be used to securely modify execution behavior of a process. Thus, it is desirable to allow a process executing in non-supervisor mode to perform dynamic linking across address spaces without compromising system security.

SUMMARY OF THE INVENTION

It is therefore the object of the present invention to provide the ability of cross address space dynamic linking, to processes executing in non-supervisor mode without compromising the security of the computer system.

It is the object of the present invention to provide the ability of cross address space dynamic linking of a program segment to a process as well as program segments at program start.

Under the present invention, these and other objects are achieved by providing a first program code manager to provide a first program code segment in a secure manner to a first process executing in non-supervisor mode in a first address space, and an address space manager for mapping the first program code segment into a second address space, linking the first program code segment to either a second program code segment if the second address space is a new address space with no executing process or a second process if the second address space has an executing process.

For the case where the second address space is a new address space with no executing process, the present invention also provides a second program code manager to provide the second program code segment in a secure manner to the first process. The address space manager is also used to provide access to the second address space in a secure manner to the first process, and for mapping the second program code segment into the second address space. The first process creates a code table and a symbol address table before linking the first and second program code segments.

For the case where the second address space has at least one executing process, the address space manager is also used to provide a code table for identifying the first program code segment as not being linked in the second process, and to provide symbol address information for generating a symbol address table. The symbol address table is used for linking the first program code segment with the second process in the second address space.

Execution of the second program code segment or the second process linked with the first program code segment is started by transferring control to a starting address within the second address space. More specifically, execution of the second process linked with the first program code segment is started by starting a new thread of execution and transferring control to the starting address of an initialization function in the second address space. The initialization function is located by the first process using the symbol address table.

Additionally, in the preferred embodiment of the present invention, a third party authentication manager is provided for authorizing the first process to be provided with the first and second program code segments, and the second address space. The code table is located at a predetermined location of the address space manager.

Furthermore, in their presently preferred form, the first and second processes, the first and second program code segments, the first and second address spaces, the first and second program managers, the address space manager and the third party authentication manager are implemented in an object oriented manner.

BRIEF DESCRIPTION OF THE DRAWINGS

The objects, features and advantages of the present invention will be apparent from the following detailed description of the preferred embodiment of the invention with references to the drawings in which.

NOTATIONS AND NOMENCLATURE

The detailed description which follows is presented largely in terms of program procedures executed on a network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those that require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, objects, characters, terms, numbers, or the like. It should be borne in mind, however, that all these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operation described herein which form part of the present invention; the operations are machine operations. Useful machines for performing the operations of the present invention include general purpose digital computers or other similar devices. In all cases, it should be borne in mind the distinction between the method operations in operating a computer and the method of computation itself. The present invention relates to method steps for operating a computer in processing electrical or other physical signals to generate other desired physical signals.

The present invention also relates to apparatus for performing these operations. This apparatus may be specially constructed for the required purposes or it may comprise a general purpose computer as selectively activated or re-configured by a computer program stored in the computer. The procedures presented herein are not entirely related to any particular computer or other apparatus. In particular, various general purpose machines may be used with procedures written in accordance with the teaching herein, or it may prove more convenient to construct more specialized apparatus to perform the required method steps. The required structure for a variety of these machines will appear from the description given below.

DETAILED DESCRIPTION OF THE PREFERRED EMBODIMENT

A method and apparatus for a process executing in a non-supervisor mode to perform cross address space dynamic linking is disclosed. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
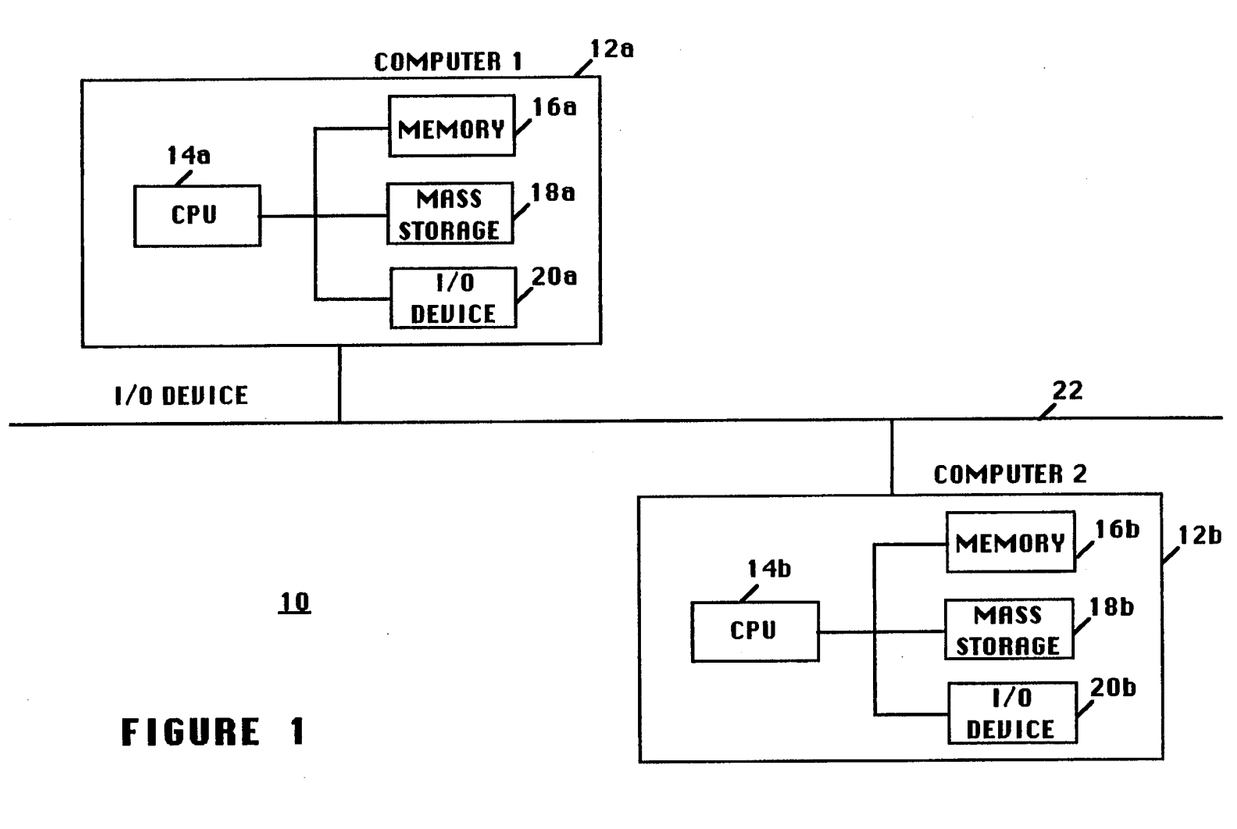
FIG. 1 shows a physical view of the hardware elements of a network of computer systems that incorporates the teachings of the present invention.

Referring now to FIG. 1, a block diagram illustrating a physical view of a network of computer systems that incorporates the teachings of the present invention organized by its hardware elements is shown. The network of computer systems 10 comprises at least one computer system 12a or 12b. If more than one computer system 12a and 12b are employed, the computer systems 12a and 12b are coupled to each other through a network 22. Each computer system 12a or 12b comprises at least one central processing unit (CPU) 14a or 14b, a memory unit 16a or 16b, a mass storage unit 18a or 18b and an input/output (I/O) device 20a or 20b. The characteristics of these hardware elements on each of the computer systems 12a or 12b, such as speed, size, may differ from each other. These hardware elements are those typically found in most general purpose computer systems and almost all special purpose computer systems. In fact, the several hardware elements contained within each of the computer system 12a and 12b are intended to be representative of this broad category of data processing systems. Particular examples of suitable data processing systems to fill the role of these computer systems 12a and 12b include computer systems manufactured by Sun Microsystems, Inc., Mountain View, Calif. Other computer systems having like capabilities may of course be adapted in a straight forward manner to perform the functions described below.

Figure 2:
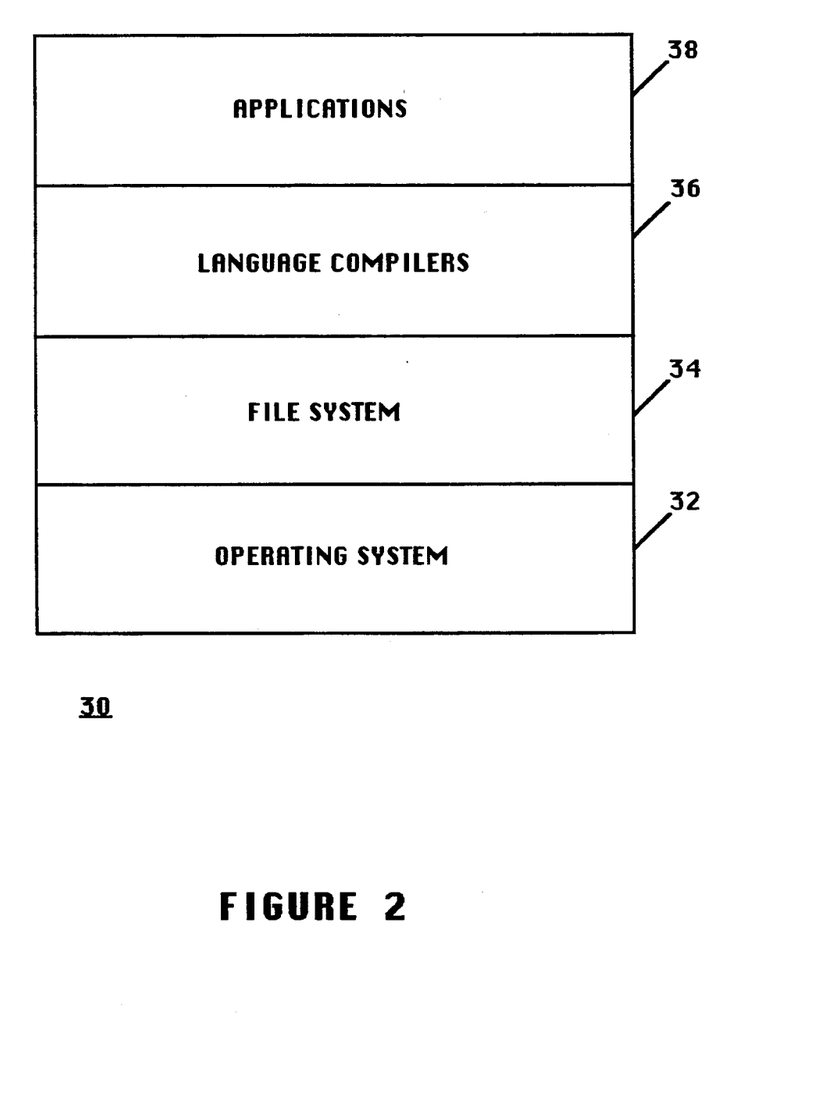
FIG. 2 shows a logical view of the software elements of one of the computer systems illustrated in FIG. 1.

Referring now to FIG. 2, a block diagram illustrating a logical view of one of the computer systems illustrated in FIG. 1 organized by its system software is shown. The system software 30 comprises an operating system 32, a file system 34, and at least one language compiler 36. Operating system 32 provides well known operating system services, in particular, network virtual memory management with a coherent page caching algorithm, and an object oriented interface for securely mapping files into address spaces on behalf of a process executing in non-supervisor mode. File system 34 provides well known file system services such as open, close, read and write. Language compiler 36 provides well known compiler services such as parsing and code generation, and well known runtime library services such as mathematical functions and string manipulations. Applications 38 executing on the computer system utilize the underlying system services offered by system software 32-36.

These system software elements, except the operating system, are those typically found in most general purpose computer systems and almost all special purpose computer systems. In fact, the several non-operating system system software elements contained within each of the computer systems are intended to be representative of this broad category of non-operating system system software. Additionally, the system software used on each of the computer systems may be different provided they offer equivalent functions and are capable of communicating with each other. For further descriptions of an operating system with network virtual memory management having a coherent page caching algorithm, see Yousef Khalidi, *Hardware Support for Distributed Operating Systems*, Ph.D. Thesis, Georgia Institute of Technology, 1988.

Figure 3:
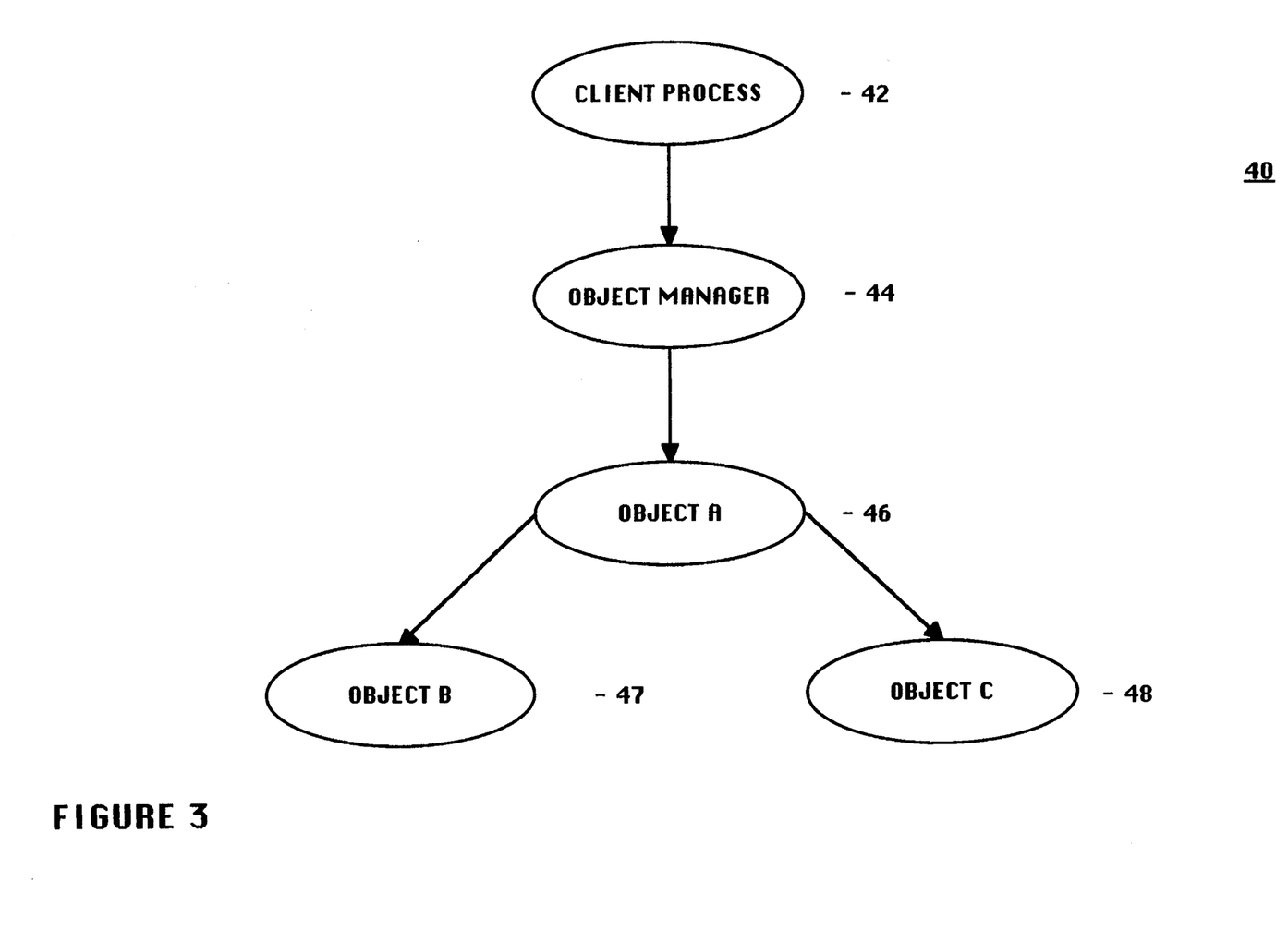
FIG. 3 shows a logical view of a client process and a plurality of objects on the network of computer systems illustrated in FIG. 1.

Referring now to FIG. 3, a block diagram illustrating a logical view of a client process, an object manager and a plurality of objects on the network of computer systems illustrated in FIG. 1 is shown. Shown in FIG. 3 is a client process 42, an object manager 44, and a plurality of objects, 46, 47, 48. A client process 42 is a process that uses an object 46, 47 or 48. Each object, 46, 47 or 48 is a component comprising data and operations which can be invoked to manipulate the data. Possession of an object 46, 47 or 48 implies right to access the object 46, 47 or 48. The operations are invoked on the object 46, 47 or 48 by sending calls to the object 46, 47 or 48. An object manager 44 is an address space in which the code for the object's operations reside. Each object 46, 47 or 48 has an object type. The object type defines the object operations that can be performed on objects 46, 47 and 48 of that particular object type. The object operations are implemented independent of the objects 46, 47 or 48 themselves. Additionally, the objects 46, 47, and 48 are organized into a class hierarchy according to their object types, thereby allowing one object type organized into a subclass to inherit the object operations defined and implemented for other object types organized in the super class. Each object 46, 47 or 48 is a class instance of a class. For further description on object-oriented design and programming techniques, see B. Meyer, *Object-oriented Software Construction*, (Prentice Hall, 1988).

It will be appreciated that the network of computer systems illustrated in FIG. 1 may comprise a variety of client processes, object managers, and objects. The client process 42, the object manager 44 and the objects 46, 47 and 48 shown in FIG. 3 are intended to be representative of a broad category of these client processes, object managers, and objects.

Figure 4:
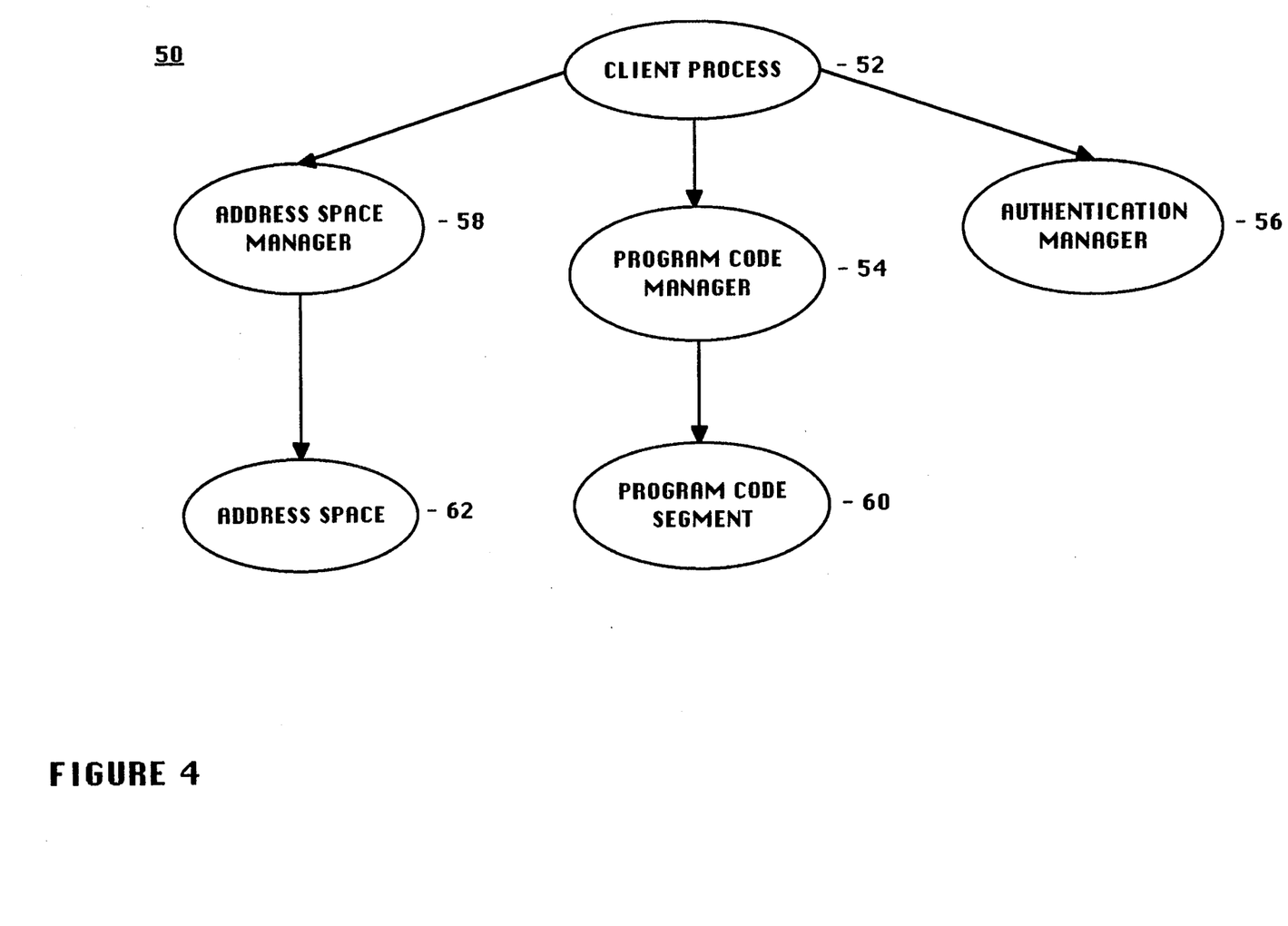
FIG. 4 shows a logical view of an address space manager, an address space object, a program code manager, a program code segment object, and an authentication manager of the present invention on the network of computer systems illustrated in FIG. 1.

Referring now to FIG. 4, a block diagram illustrating an address space manager, an address space object, a program manager, a program code segment object, and an authentication manager of the present invention is shown. Shown is a program code manager 54 providing an object oriented interface to a client process 52 for accessing a program code segment object 60. The program code segment object 60 comprises executable binary code of a program or a program segment. In its presently preferred form, the program code manager 54 validates the client's access authority using a trusted third party authentication manager 56. For further descriptions of a trusted third party authentication manager, see Michael Burrows, Martin Abadi, and Roger Needham, *A Logic of Authentication*, ACM Transactions on Computer Systems, 8(1), 1990, pp 18–36.

Also shown in FIG. 4 is an address space manager 58 providing an object oriented interface to the client process 52 for obtaining an address space object 62. Similarly, in its presently preferred form, the address space manager 58 validates the client's access authority using the trusted third party authentication manager 56.

The address space object 62 comprises an address space (not shown) and provides an object oriented interface for performing limited operations on the address space on behalf of client processes executing in non-supervisor mode. The limited operations comprise an operation for returning a list of memory objects mapped into the address space and the corresponding base addresses for the memory objects, and an operation of mapping a program code segment and/or a group of data into the address space, producing a memory object corresponding to the mapped memory. During a mapping operation, the program code and/or the group of data is inserted into the address space in bulk, and the addresses of the address space is associated with the program code and/or data. As described earlier, during the operation of linking, references in one program code segment which require addresses in another program code segment are resolved.

Additionally, during a mapping operation, symbol address information about a program segment is obtained from the program segment by accessing the locations where the program segment is deposited. The symbol address information is used to generate a symbol address table comprising name to address cross reference entries for the address space. The generated symbol address table is in turn used to facilitate linking a program code segment to another program code segment or a process, which will be discussed in further detail later. The symbol address information comprises names and addresses of functions and data in the program segment being mapped.

The limited operations further comprise an operation for obtaining linked program segment information of the address space from the address space's code table (not shown). The linked program segment information is used to determine whether a program code segment is already linked to a process in the address space, which will be described in further detail later. The code table comprises entries for each linked program code segment for the address space. Each entry comprises the linked program code segment's base address, size, and name of the mapped file. Additionally, the code table comprises a semaphore for locking the code table when the code table is in use. The operations for logging a program code segment as being linked in the address space, removing the log entries, confirming whether a program code segment is already linked in the address space, setting and clearing the semaphore are all performed by mapping the memory object associated with the code table into the address space and operating upon the memory there. In their presently preferred form, the code table is located at a predetermined location in the address space 62.

It will be appreciated that the network of computer systems illustrated in FIG. 1 may comprise a variety of client processes, program code managers, program code segment objects, authentication managers, address space managers, and address space objects. The client process 52, the program code manager 54, the authentication manager 56, the address space manager 58, the program code segment object 60, and the address space object 62 shown in FIG. 4 are intended to be representative of a broad category of these client processes, object managers, and objects.

Figure 5:
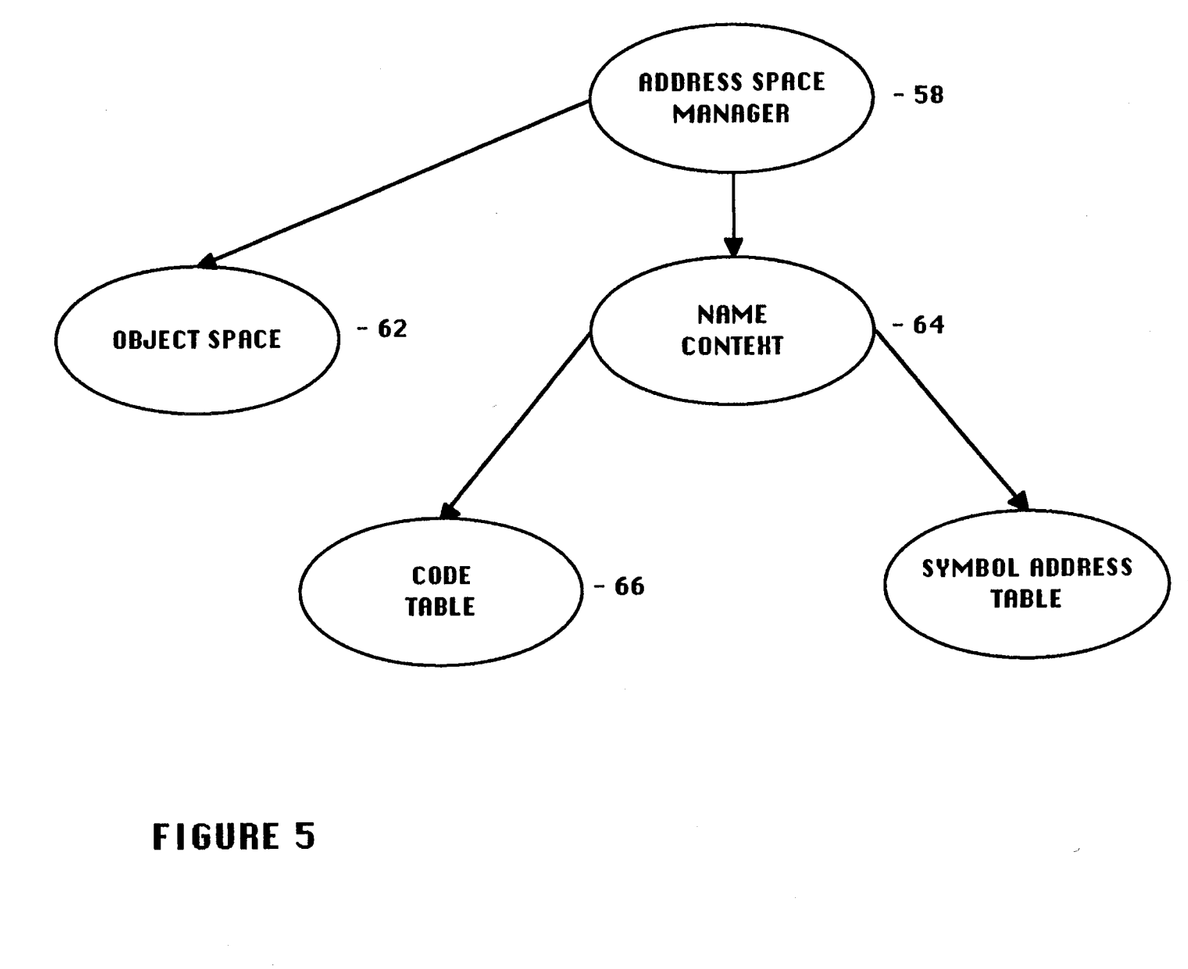
FIG. 5 shows a logical view of an address space manager, an address space object, a name context object, a code table object and a symbol address table object of the present invention on the network of computer systems illustrated in FIG. 1, as an alternate approach to provide program code segment linkage and name to address information for the address space.

Referring now to FIG. 5, a block diagram illustrates an alternate approach for accessing the linked program segment and the symbol address information is shown. Shown is a name context object 64 providing an object oriented interface for accessing the linked program segment information from a code table object 66 and the symbol address information from a symbol address table object 68 on behalf of a client process executing in non-supervisor mode. Instead of being located at a predetermined location of the address space, the code table is located in the code table object 66. Similarly, instead of obtaining the symbol address information directly from the program segment being mapped and generating the symbol address table, the symbol address information is maintained in the symbol address table object 68. Under this approach, the address space manager 52 also supports operations for accessing a name context in the name context object 64.

The name context object 64 comprises a name context (not shown) having name to object cross reference entries for the address space. The name context object 64 supports operations for binding an object to a name, removing the binding to a name, and resolving a name to an object. The code table object 66 and the symbol address table object 68 are obtained from the name context object 64, by resolving well known names to these objects.

Unlike the previously described approach, the code table does not have a semaphore. The code table is removed when accessed by a client process, thereby preventing the code table from being used by another process while it is being used. The code table object 66 supports operations for logging a program code segment as being linked in the address space, removing the log entries and confirming whether a program code segment is already linked in the address space.

The symbol address table comprises name to address cross reference entries for the address space. Additionally, the symbol address object 68 supports operations for cross referencing a name to an address, removing a name to address cross reference, and resolving a name to an address within the address space.

Figure 6:
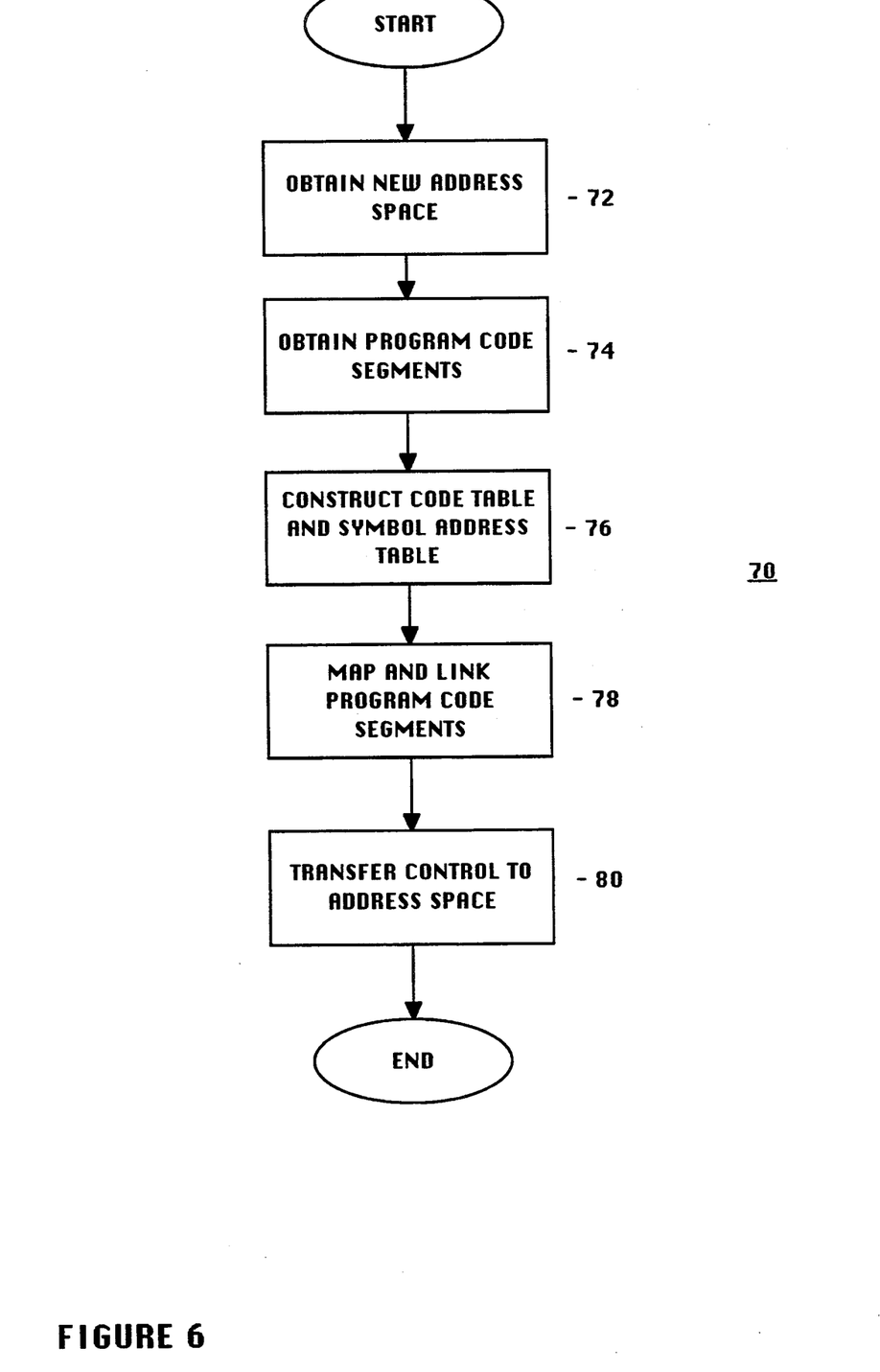
FIG. 6 illustrates the method of the present invention for non-supervisor mode cross address space dynamic linking of program code segments at program start up.

Referring now to FIG. 6, a flow chart illustrating the method of the present invention for non-supervisor mode cross address space linking of program code segments at program start up is shown. Initially, the client process obtains a new address space object with no executing process from an address space manager, and obtains the program code segment objects from one or more program code managers, blocks 72 and 74. As described earlier, in the preferred embodiment, the client process' authority to obtain the new address space object and the program code segment objects is validated using a trusted third party authentication manager.

The client process then constructs a code table and a symbol address table for the address space, block 76. The client process also updates the name context if the name context approach is used. The client process then maps the program code segments into the new address space and into its own address space, and links them together relative to addresses in the new address space, block 78. The client process exports the code table in the address space if the name context approach is used. After linking the program code segments, the client process starts execution of the linked program by transferring control to the starting address of the linked program in the new address space, block 80.

Figure 7:
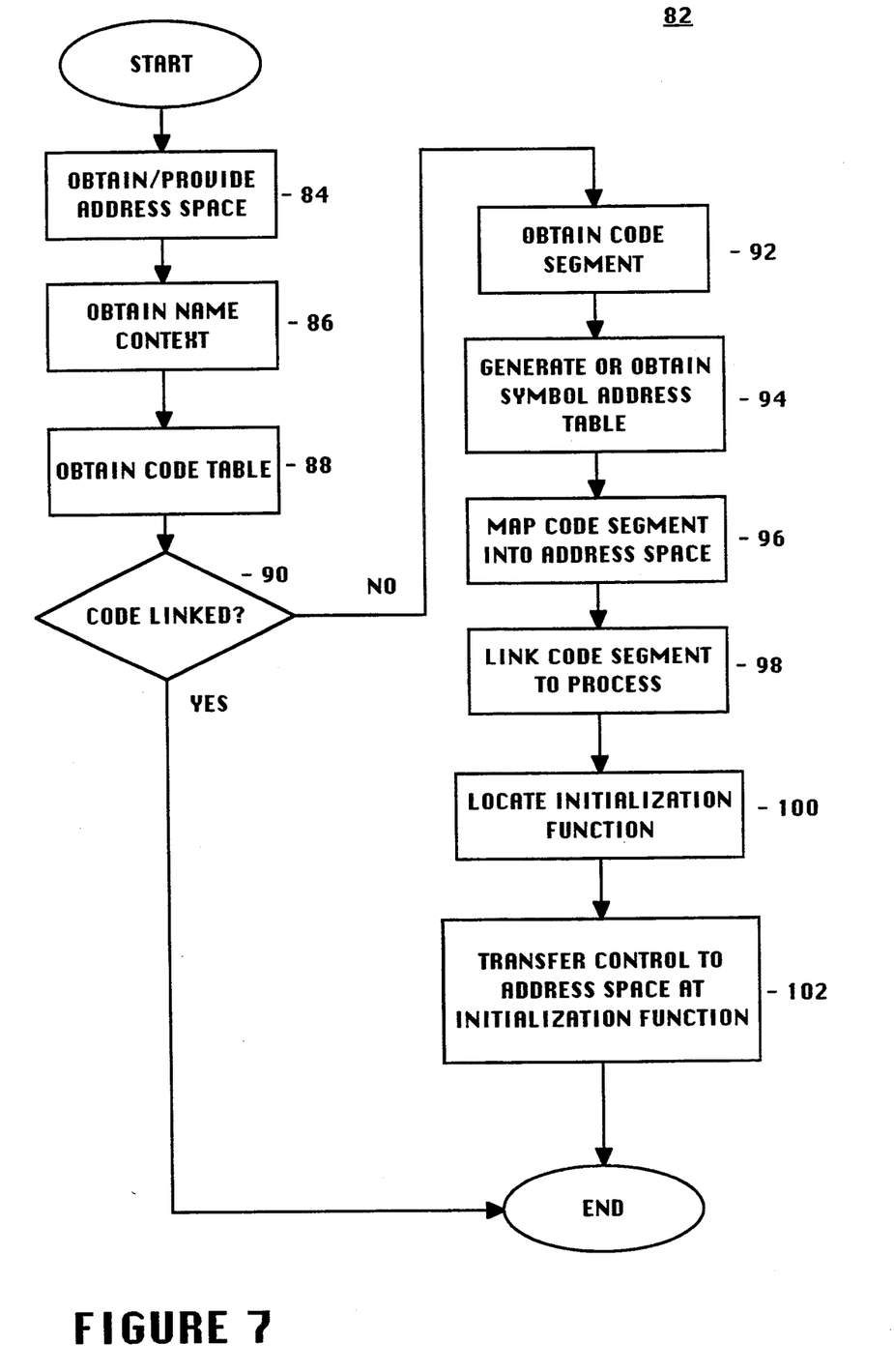
FIG. 7 illustrates the method of the present invention for non-supervisor mode cross address space dynamic linking of a program code segment to a process.

Referring now to FIG. 7, a flow chart illustrating the method of the present invention for non-supervisor mode cross address space dynamic linking of a program segment to a process is shown. Initially, the client process obtains an address space with an executing process, block 84. The client process then obtains the code table for the address space, block 88, with or without obtaining a name context first, depending whether the code table is located in a predetermined location of the address space manager or in a code table object. Similarly, as described earlier, in the preferred embodiment, the client process' authority to obtain the address space, the code table, and the name context if used, is validated using a trusted third party authentication manager.

If the code table indicates that the program code segment has not been linked in the address space, the client then obtains the program code segment object from a program code manager, block 92, and generates the symbol address table for the address space or obtains the symbol address table if the name context approach is used, block 94. Likewise, as described earlier, in the preferred embodiment, the client process' authority to obtain the program code segment object is validated using a trusted third party authentication manager.

The client process then maps the program code segment into the address space and into its own address space and links the program code segment relative to addresses in the executing process, blocks 96 and 98. Upon linking the program code segment to the executing process, the client process then locates the initialization function of the program code segment, block 100. Upon locating the initialization function, the client process starts a new thread of execution for the executing process linked with the program code segment and transfers control to the starting address of the initialization function.

It will be appreciated that the step of obtaining the code table object of the address space object and determining whether the program code segment is already linked in the address space, blocks 88 and 90, may be skipped if the client process knows whether the program code segment is linked or not. Similarly, the step of obtaining the address space object, block 86, may also be skipped if the client process has obtained the address space object.

It will also be appreciated that the method of the present invention for non-supervisor mode cross address space dynamic linking of a program segment to a process illustrated in FIG. 7 also may be applied to dynamically linking a program segment to the client process itself. The target address space is the client process' own address space and the target process is the client process itself.

It will be further appreciated that the present invention does not have to be practiced in an object oriented manner. The elements of the present invention may be adapted to their non-object oriented equivalents, and these non-object oriented equivalents be accessed using well known approaches such as handles.

While the present invention has been described in terms of a presently preferred embodiment, those skilled in the art will recognize that the invention is not limited to the embodiment described. The method and apparatus of the present invention can be practiced with modification and alteration within the spirit and scope of the appended claims, The description is thus to be regarded as illustrative instead of restrictive on the present invention.

What is claimed is:

1. In a network of computer systems comprising at least one central processing unit (CPU) having a supervisor mode and a non-supervisor mode of execution, a method for a first process executing in said non-supervisor mode in a first address space to dynamically link a first program code segment to a second program code segment in a second address space, without compromising said computer systems' security, said method comprising the steps of:

a) obtaining said first and second program code segments and access to said second address space from a first and a second program code manager and an address space manager respectively by said first process, said first and second program code managers and said address space manager authenticating said first process as being authorized to obtain said first and second program code segments and said access to said second address space using a third party authentication manager;

b) causing said obtained first and second program code segments to be mapped into said first and second address spaces by said first process using said address space manager;

c) deriving linkage information of said first and second program code segments by said first process using said mapped first and second program code segments in said first address space, and linking said mapped first program code segment in said second address space to said mapped second program code segment in said second address space by said first process using said derived linkage information; and d) transferring execution control by said first process to a start address in said second address space.

2. The method as set forth in claim 1, wherein, said step c) comprises the steps of:

c.1) creating a code table in said second address space by said first process comprising linked program code segment information of said second address space;

c.2) deriving names and corresponding addresses information for said second address space from said first and second program code segments mapped in said first address space by said first process;

c.3) creating a symbol address table in said second address space by said first process comprising said derived names and corresponding addresses; and c.4) linking said first program code segment mapped in said second address space to said second program code segment mapped in said second address space by said first process using said derived names and corresponding addresses.

3. The method as set forth in claim 2, wherein, said first process, said first and second program code segments, said first and second address spaces, said first and second program code managers, said address space manager, and said third party authentication manager, are implemented in an object oriented manner.

4. In a network of computer systems comprising at least one central processing unit (CPU) having a supervisor mode and a non-supervisor mode of execution, a method for a first process executing in said non-supervisor mode in a first address space to dynamically link a first program code segment to a second process in a second address space, without compromising said computer systems' security, said method comprising the steps of:

a) obtaining said first program code segment and access to said second address space from a first program code manager and an address space manager respectively by said first process, said first program code manager and said address space manager authenticating said first process as being authorized to obtain said first program code segment and said access to said second address space using a third party authentication manager;

b) causing said obtained first program code segment to be mapped into said second address space by said first process using said address space manager;

c) deriving linkage information of said first program code segment by said first process using said mapped first program code segment in said second address space, updating a symbol address table of said second address space by said first process using said derived linkage information, and linking said first program code segment mapped in said second address space to said second process in said second address space by said first process using linkage information in said updated symbol address table of said second address space; and d) transferring execution control to a start address in said second address space by said first process.

5. The method as set forth in claim 4, wherein, said step c) comprises the steps of:

c.1) obtaining a code table from said second address space by said first process comprising linked program code segment information of said second address space, and updating said code table by said first process;

c.2) deriving updates to names and corresponding addresses of said second address space by said first process using said first program code segment mapped in said address space, and modifying said symbol address table of said second address space by said first process using said derived updates; and c.3) linking said first program code segment mapped in said second address space to said second process in said second address space by said first process using said updated names and corresponding addresses of said second address space; and said step d) comprises locating an initialization function in said second address space by said first process using said symbol address table in said second address space, and calling said located initialization function by said first process.

6. The method as set forth in claim 5, wherein, said first and second processes, said first program code segment, said first and second address spaces, said first program code manager, said address space manager, and said third party authentication manager, are implemented in an object oriented manner.

7. The method as set forth in claim 4, wherein, said step (b) further comprises causing said first program code segment to be mapped into said first address space by said first process using said address space manager;

said first process derives said linkage information of said first program segment using said first program code segment mapped in said first address space instead.

8. The method as set forth in claim 7, wherein, said step c) comprises the steps of:

c.1) obtaining a code table from said second address space by said first process comprising linked program code segment information of said second address space, and updating said code table in said second address space by said first process;

c.2) deriving updates to names and corresponding addresses of said second address space by said first process using said first program code segment mapped in said first address space, and modifying said symbol address table of said second address space by said first process using said derived updates; and c.3) linking said first program code segment mapped in said second address space to said second process in said second address space by said first process using said updated names and corresponding addresses of said second address space; and said step d) comprises locating an initialization function in said second address space by said first process using said symbol address table in said second address space, and calling said located initialization function by said first process.

9. In a network of computer systems comprising at least one central processing unit (CPU) having a supervisor mode and a non-supervisor mode of execution, an apparatus for a first process executing in said non-supervisor mode in a first address space to dynamically link a first program code segment to a second program code segment in a second address space, without compromising said computer systems' security, said apparatus comprising:

a) a third party authentication manager coupled to said first process for authenticating said first process as being authorized to obtain said first and second program code segments and access to said second address space;

b) a first and a second program code manager coupled to said third party authentication manager and said first process for providing said first and second program code segments to said first process respectively, after authenticating said first process as being authorized to obtain said first and second program code segments; and c) an address space manager coupled to said third party authentication manager and said first process for providing access to said second address space to said first process after authenticating said first process as being authorized to have access to said second address space, and for mapping said first and second program code segments into said first and second address spaces at the request of said first process;

wherein said first process links said first program code segment in said second address space to said second program code segment in said second address space using linkage information derived from said first and second program code segments mapped in said first address space, after having obtained said first and second program code segments and said access to said second address space, and caused said first and second program code segments to be mapped into said first and second address spaces using said address space manager, and wherein execution of said linked first and second program code segments is started by said first process by transferring execution from said first process to a start address in to said second address space.

10. The apparatus as set forth in claim 9, wherein, said derived linkage information comprises names and corresponding addresses of said second address space derived by said first process from said first and second program code segments mapped in said first address space: and said first process further creates a symbol address table and a code table in said second address space, said symbol address table comprising said derived names and corresponding addresses of said second address space, and said code table comprising linked program code segment information of said second address space.

11. The apparatus as set forth in claim 10, wherein, said first process, said first and second program code segments, said first and second address spaces, said first and second program code managers, said address space manager, and said third party authentication manager, are implemented in an object oriented manner.

12. In a network of computer systems comprising at least one central processing unit (CPU) having a supervisor mode and a non-supervisor mode of execution, an apparatus for a first process executing in said non-supervisor mode in a first address space to dynamically link a first program code segment to a second process in a second address space, without compromising said computer systems' security, said apparatus comprising:
   a) a third party authentication manager coupled to said first process for authenticating said first process as being authorized to obtain said first program code segment and access to said second address space;
   b) a first program code manager coupled to said third party authentication manager and said first process for providing said first program code segment to said first process respectively after authenticating said first process as being authorized to obtain said first program code segment using said third party authentication manager; and
   c) an address space manager coupled to said third party authentication manager for providing access to said second address space to said first process after authenticating said first process as being authorized to have access to said second address space using said third party authentication manager, and mapping said first program code segment into said first and second address spaces at the request of said first process;
   wherein said first process links said first program code segment in said second address space to said second process in said second address space using updated linkage information in a symbol address table of said second address space modified with updates derived from said first program code segment mapped in said second address space, after having obtained said first program code segment and access to said second address space, and caused said first program code segment to be mapped into said second address spaces using said address space manager, and wherein execution of said second process linked with said first program code segment is started by said first process by transferring execution from said first process to a start address in said second address space.

13. The apparatus as set forth in claim 12, wherein, said updated linkage information comprises updated names and corresponding addresses in said symbol address table of said second address space modified by names and corresponding address updates derived by said first process from said first program segment mapped in said second address space: and
said first process transfers control to said second process linked with said first program segment by calling an initialization function in said second address space, said initialization function being located using said symbol address table.

14. The apparatus as set forth in claim 13, wherein, said first and second processes, said first program code segment, said first and second address spaces, said first program code manager, said address space manager, and said third party authentication manager, are implemented in an object oriented manner.

15. The apparatus as set forth in claim 12, wherein, said first process further causes said first program code segment to be mapped into said first address space using said address space manager; and
said first process derives said linkage information of said first program segment using said first program code segment mapped in said first address space instead.

16. The apparatus as set forth in claim 15, wherein, said updated linkage information comprises updated names and corresponding addresses in said symbol address table of said second address space modified by names and corresponding address updates derived by said first process from said first program segment mapped in said first address space; and
said first process transfers control to said second process linked with said first program segment by calling an initialization function in said second address space, said initialization function being located using said symbol address table.

* * * * *

UNITED STATES PATENT AND TRADEMARK OFFICE
CERTIFICATE OF CORRECTION

PATENT NO. : 5,359,721
DATED : October 25, 1994
INVENTOR(S) : Kempf et al.

It is certified that error appears in the above-identified patent and that said Letters Patent is hereby corrected as shown below:

In column 11, claim 5 at line 28, please delete " in said address space " and insert -- in said second address space --.

Signed and Sealed this

Seventeenth Day of November, 1998

*Attest:*

BRUCE LEHMAN

*Attesting Officer*    *Commissioner of Patents and Trademarks*